(12) United States Patent
Shlens et al.

(10) Patent No.: US 11,257,217 B2
(45) Date of Patent: Feb. 22, 2022

(54) IMAGE SEGMENTATION USING NEURAL NETWORKS

(71) Applicant: Google LLC, Mountain View, CA (US)

(72) Inventors: Jonathon Shlens, San Francisco, CA (US); Niruban Maheswaranathan, Mountain View, CA (US); David Sussillo, Portola Valley, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/761,381

(22) PCT Filed: Nov. 20, 2018

(86) PCT No.: PCT/US2018/062057
§ 371 (c)(1),
(2) Date: May 4, 2020

(87) PCT Pub. No.: WO2019/100065
PCT Pub. Date: May 23, 2019

(65) Prior Publication Data
US 2020/0364872 A1   Nov. 19, 2020

Related U.S. Application Data

(60) Provisional application No. 62/588,883, filed on Nov. 20, 2017.

(51) Int. Cl.
*G06T 7/11* (2017.01)
*G06N 3/04* (2006.01)
*G06N 3/08* (2006.01)

(52) U.S. Cl.
CPC .............. *G06T 7/11* (2017.01); *G06N 3/0454* (2013.01); *G06N 3/084* (2013.01); *G06T 2207/20081* (2013.01); *G06T 2207/20084* (2013.01)

(58) Field of Classification Search
CPC .... G06N 3/0454; G06N 3/084; G06N 3/0445; G06T 7/11; G06T 2207/20081; G06T 2207/10016; G06T 2207/20084
See application file for complete search history.

(56) References Cited

U.S. PATENT DOCUMENTS

2016/0358337 A1* 12/2016 Dai ............................ G06T 7/11
2018/0268548 A1*  9/2018 Lin ........................ G06N 3/084
(Continued)

OTHER PUBLICATIONS

Abadi et al., "TensorFlow: Large-scale machine learning on heterogeneous distributed systems", arXiv: 1603.04467, Mar. 2016, 19 pages.
(Continued)

*Primary Examiner* — Syed Haider
(74) *Attorney, Agent, or Firm* — Fish & Richardson P.C.

(57) ABSTRACT

A method for generating a segmentation of an image that assigns each pixel to a respective segmentation category from a set of segmentation categories is described. The method includes obtaining features of the image, the image including a plurality of pixels. For each of one or more time steps starting from an initial time step and continuing until a final time step, the method includes generating a network input from the features of the image and a current segmentation output as of the time step, processing the network input using a convolutional recurrent neural network to generate an intermediate segmentation output for the time step, and generating an updated segmentation output for the time step from the intermediate segmentation output for the time step and the current segmentation output as of the time step. The method includes generating a final segmentation of the image from the updated segmentation output.

19 Claims, 3 Drawing Sheets

(56) References Cited

U.S. PATENT DOCUMENTS

| | | | | |
|---|---|---|---|---|
| 2018/0350077 | A1* | 12/2018 | Lin | G06K 9/6274 |
| 2019/0114774 | A1* | 4/2019 | Zhang | G06N 3/04 |
| 2019/0164290 | A1* | 5/2019 | Wang | G06K 9/00973 |
| 2020/0167930 | A1* | 5/2020 | Wang | G06T 7/0012 |

OTHER PUBLICATIONS

Angelova et al., "Pedestrian detection with a large-field-of-view deep network", IEEE International Conference on Robotics and Automation, Jun. 2015, pp. 704-711.

Ba et al., "Multiple object recognition with visual attention", International Conference of Learned Representations, Apr. 2015, 10 pages.

Bai et al., "Deep watershed transform for instance segmentation", IEEE Conference on Computer Vision and Pattern Recognition, Jul. 2017, pp. 2858-2866.

Barron et al., "Fast bilateral-space stereo for synthetic defocus", IEEE Conference on Computer Vision and Pattern Recognition, 2015, pp. 4466-4474.

Barron et al., "The fast bilateral solver", European Conference on Computer Vision, Oct. 2016, pp. 617-632.

Bojarski et al., "End to end learning for self-driving cars", arXiv: 1604.07316, Apr. 2016, 9 pages.

Chen et al., "Deeplab: Semantic image segmentation with deep convolutional nets, atrous convolution, and fully connected crfs", IEEE Transactions on Pattern Analysis and Machine Intelligence, Apr. 2017, 40(4):834-848.

Chen et al., "MXNet: A flexible and efficient machine learning library for heterogeneous distributed systems", arXiv: 1512.01274, Dec. 2015, 6 pages.

Chen et al., "Rethinking atrous convolution for semantic image segmentation", arXiv: 1706.05587, Jun. 2017, 14 pages.

Chetlur et al., "cuDNN: Efficient primitives for deep learning", arXiv:1410.0759, Dec. 2014, 9 pages.

Collins et al., "Capacity and trainability in recurrent neural networks", International Conference of Learned Representations, Nov. 2016, 17 pages.

Cordts et al., "The cityscapes dataset for semantic urban scene understanding", IEEE Conference on Computer Vision and Pattern Recognition, Dec. 2016, pp. 3213-3223.

Dai et al., "Boxsup: Exploiting bounding boxes to supervise convolutional networks for semantic segmentation", IEEE International Conference on Computer Vision, 2015, pp. 1635-1643.

Dai et al., "Convolutional feature masking for joint object and stuff segmentation", IEEE Conference on Computer Vision and Pattern Recognition, Jun. 2015, pp. 3992-4000.

Deng et al., "Imagenet: A large-scale hierarchical image database", IEEE Conference on Computer Vision and Pattern Recognition, Jun. 2009, pp. 248-255.

Denton et al., "Deep generative image models using a laplacian pyramid of adversarial networks", Advances in neural information processing systems, Dec. 2015, 1:1486-1494.

Donahue et al., "Decaf: A deep convolutional activation feature for generic visual recognition", International Conference on Machine Learning, 2014, 32(1):647-655.

Eigen et al., "Predicting depth, surface normals and semantic labels with a common multi-scale convolutional architecture", IEEE International Conference on Computer Vision, Dec. 2015, pp. 2650-2658.

Eigen et al., "Depth map prediction from a single image using a multi-scale deep network", Advances in Neural Information Processing Systems Jun. 27, 2014, pp. 2366-2374.

Erhan et al., "Scalable object detection using deep neural networks", IEEE Conference on Computer Vision and Pattern Recognition, Jun. 2014, 8 pages.

Everingham et al., "The pascal visual object classes (voc) challenge", International Journal of Computer Vision, Jun. 2010, 88(2):303-338.

Fu et al., "Stacked deconvolutional network for semantic segmentation", arXiv: 1708.04943, Aug. 2017, 12 pages.

Gall, "Mpeg: A video compression standard for multimedia applications", Communications of the ACM, Apr. 1991, 34(4):46-58.

Ghiasi et al., "Laplacian pyramid reconstruction and refinement for semantic segmentation", European Conference on Computer Vision, Oct. 2016, pp. 519-534.

Girshick, "Fast r-cnn.", IEEE International Conference on Computer Vision, Dec. 2015, pp. 1440-1448.

Girshick, "Rich feature hierarchies for accurate object detection and semantic segmentation", IEEE Conference on Computer Vision and Pattern Recognition, Jun. 2014, pp. 580-587.

Giusti et al., "Fast image scanning with deep max-pooling convolutional neural networks", IEEE International Conference on Image Processing, Feb. 2013, pp. 4034-4038.

Goodfellow et al., "Deep learning", MIT press, Nov. 2016, 797 pages.

Graves, "Adaptive computation time for recurrent neural networks", arXiv: 1603.08983, Mar. 2016, 19 pages.

Gregor et al., "Draw: A recurrent neural network for image generation", International Conference on Machine Learning, 2015, 37:1462-1471.

Ha et al., "HyperNetworks", International Conference on Learning Representations, Feb. 2017, 18 pages.

Hariharan et al., "Hypercolumns for object segmentation and fine-grained localization", IEEE Conference on Computer Vision and Pattern Recognition, Apr. 2015, pp. 447-456.

Hartmann et al., "Weakly supervised learning of object segmentations from web-scale video", Computer Vision ECCV, Oct. 2012, 7583:198-208.

He et al., "Deep residual learning for image recognition", IEEE Conference on Computer Vision and Pattern Recognition, Dec. 2016, pp. 770-778.

Hochreiter et al., "Long short-term memory", Neural computation, Nov. 1997, 9(8):1735-1780.

Holschneider et al., "A real-time algorithm for signal analysis with the help of the wavelet transform", Wavelets, 1990, pp. 286-297.

Howard et al., "MobileNets: Efficient convolutional neural networks for mobile vision applications", arXiv:1704,04861, Apr. 2017, 9 pages.

Hu et al., "Real-time depth of field rendering with bokeh effect", IEEE 17th International Symposium on Consumer Electronics, Jun. 2013, pp. 99-100.

International Preliminary Report on Patentability and Written Opinion in International Application No. PCT/US2018/062057, dated May 26, 2020, 13 pages.

International Search Report and Written Opinion in International Application No. PCT/US2018/062057, dated Feb. 22, 2019, 19 pages.

Jouppi et al., "In-datacenter performance analysis of a tensor processing unit", arXiv: 1704.04760, Apr. 2017, 17 pages.

Krizhevsky et al., "Imagenet classification with deep convolutional neural networks", Advances in Neural Information Processing System, Dec. 2012, 1:1097-1105.

Lafferty et al., "Conditional random fields: Probabilistic models for segmenting and labeling sequence data" University of Pennsylvania ScholarlyCommons, Jun. 2001, 10 pages.

LeCun et al., "Deep learning", Nature, May 2015, 521(7553):436-444.

Ledig et al., "Photo-realistic single image super-resolution using a generative adversarial network", IEEE Conference on Computer Vision and Pattern Recognition, Sep. 2016, 19 pages.

Levoy et al., "Portrait mode on the pixel 2 and pixel 2 xl smartphones", Google AI Blog, Oct. 2017, 11 pages.

Liu et al., "Efficient piecewise training of deep structured models for semantic segmentation", IEEE Conference on Computer Vision and Pattern Recognition, Jun. 2016, pp. 3194-3203.

Liu et al., "Sift flow: Dense correspondence across scenes and its applications", IEEE Transactions on Pattern Analysis and Machine Intelligence, May 2011, 33(5):978-994.

Liu et al., "Parsenet: Looking wider to see better", arXiv: 1506.04579, Nov. 2015, 11 pages.

(56) References Cited

OTHER PUBLICATIONS

Liu et al., "Semantic image segmentation via deep parsing network", IEEE International Conference on Computer Vision, Sep. 2015, 1:1377-1385.
Long et al., "Fully convolutional networks for semantic segmentation", IEEE Conference on Computer Vision and Pattern Recognition, Jun. 2015, 1:3431-3440.
Mostajabi et al., "Feedforward semantic segmentation with zoom-out features", IEEE Conference on Computer Vision and Pattern Recognition, 2015, pp. 3376-3385.
Noh et al., "Learning deconvolution network for semantic segmentation", IEEE International Conference on Computer Vision, 2015, pp. 1520-1528.
Papandreou et al., "Modeling local and global deformations in deep learning: Epitomic convolution, multiple instance learning, and sliding window detection", IEEE Conference on Computer Vision and Pattern Recognition, 2015, pp. 390-399.
Pinheiro et al., "Recurrent Convolutional Neural Networks for Scene Labeling", Proceedings of the 31st International Conference on Machine Learning, Jun. 2014, 32(1):82-90.
Ren et al., "End-to-end instance segmentation and counting with recurrent attention", IEEE Conference on Computer Vision and Pattern Recognition, Jul. 2017, pp. 6656-6664.
Ren et al., "Faster R-CNN: Towards real-time object detection with region proposal networks", Advances in Neural Information Processing Systems, Jun. 2015, pp. 91-99.
Ronneberger et al., "U-net: Convolutional networks for biomedical image segmentation", International Conference on Medical Image Computing and Computer-Assisted Intervention, May 2015, pp. 234-241.
Sermanet et al., "Attention for fine-grained categorization", International Conference of Learned Representations, Apr. 2015, 11 pages.
Sermanet et al., "Overfeat: Integrated recognition, localization and detection using convolutional networks", arXiv: 1312.6229, Dec. 2013, 16 pages.
Simonyan et al., "Very deep convolutional networks for large-scale image recognition", International Conference on Learning Representations, Apr. 2015, 14 pages.
Sukhbaatar et al., "End-to-end memory networks", Advances in neural information processing systems, 2015, pp. 2440-2448.
Szegedy et al., "Deep neural networks for object detection", Advances in Neural Information Processing Systems Dec. 26, 2013, 2:2553-2561.
Szegedy et al., "Going deeper with convolutions", IEEE Conference on Computer Vision and Pattern Recognition, Jun. 2015, 9 pages.
Tang et al., "Discriminative segment annotation in weakly labeled video", IEEE conference on computer vision and pattern recognition, Jun. 2013, pp. 2483-2490.
Toderici et al., "Variable rate image compression with recurrent neural networks", International Conference of Learned Representations, Mar. 2016.
Warden, "Running tensorflow graphs on microcontrollers", Pete Warden's Blog, May 2017, 3 pages.
Williams et al., "Scaling recurrent neural network language models", IEEE International Conference on Acoustics, Speech and Signal Processing, Feb. 2015, pp. 5391-5395.
Wu et al., "Bridging category-level and instance-level semantic image segmentation", arXiv: 1605.06885, May 2016, 14 pages.
Wu et al., "Google's neural machine translation system: Bridging the gap between human and machine translation", arXiv: 1609.08144, Oct. 2016, 23 pages.
Xingjian et al., "Convolutional LSTM network: A machine learning approach for precipitation nowcasting", Advances in neural information processing systems, 2015, pp. 802-810.
Yu et al., "Multi-scale context aggregation by dilated convolutions", arXiv:1511.07122, Nov. 2015, 13 pages.
Yurdakul et al., "Semantic Segmentation of RGBD Videos with Recurrent Fully Convolutional Neural Networks", IEEE International Conference on Computer Vision Workshops, Oct. 2017, pp. 367-374.
Zhang et al., "Shufflenet: An extremely efficient convolutional neural network for mobile devices", arXiv: 1707.01083, Dec. 2017, 9 pages.
Zhao et al., "Pyramid scene parsing network", arXiv: 1612.01105, Dec. 2016, 11 pages.
Zheng et al., "Conditional random fields as recurrent neural networks", IEEE International Conference on Computer Vision, Feb. 2015, pp. 1529-1537.
Zoph et al., "Learning transferable architectures for scalable image recognition", arXiv:1707.07012, Jul. 2017, 14 pages.

\* cited by examiner

IMAGE SEGMENTATION USING NEURAL NETWORKS

CROSS REFERENCE TO RELATED APPLICATIONS

This application is a National Stage Application under 35 U.S.C. § 371 and claims the benefit of International Application No. PCT/US2018/062057, filed on Nov. 20, 2018, which claims priority to U.S. Application Ser. No. 62/588, 883, filed on Nov. 20, 2017. The entire contents of which are hereby incorporated by reference.

BACKGROUND

This specification relates to segmenting images using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short-term memory (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes a system implemented as computer programs on one or more computers in one or more locations that segments an input image using a recurrent neural network. In particular, the input image includes multiple pixels and the system generates a segmentation of the input image that assigns each of the pixels to a respective segmentation category from a predetermined set of segmentation categories.

The subject matter described in this specification can be implemented in particular embodiments so as to realize one or more of the following advantages. By segmenting images using the iterative process described in this specification, the system can accurately segment input images by improving upon segmentations generated at previous iterations. Moreover, by segmenting images as described in this specification, the system can effectively modulate the amount of computational resources consumed by the segmentation process to satisfy constraints on available computational resources, time to generate the segmentation, or segmentation quality. In particular, the system can effectively adjust the number of time steps over which the image segmentation is generated to account for differing process constraints without needing to retrain the neural network used to generate the segmentation. In other words, the system can effectively adjust the amount of computational resources consumed by the image segmentation process by dynamically adjusting the number of time steps over which the image segmentation is generated.

A first aspect of the disclosure provides a method performed by one or more computers. The method includes obtaining features of an input image, the input image comprising a plurality of pixels. The method further includes, for each of one or more time steps starting from an initial time step and continuing until a final time step: generating a network input from the features of the input image and a current segmentation output as of the time step, wherein the current segmentation output defines a current segmentation of the input image that assigns each of the plurality of pixels to a respective segmentation category from a predetermined set of segmentation categories; processing the network input using a convolutional recurrent neural network to generate an intermediate segmentation output for the time step; and generating an updated segmentation output for the time step from the intermediate segmentation output for the time step and the current segmentation output as of the time step. The method further includes generating a final segmentation of the input image from the updated segmentation output for the final time step.

The method may further comprise outputting the final segmentation of the input image. Obtaining the features of the input image may comprise: receiving the input image; and processing the input image using a convolutional neural network to generate the features of the input image. The convolutional neural network may comprise a plurality of layers and has been pre-trained on an image classification task, and wherein the features of the input image are generated from the outputs of one or more intermediate layers of the convolutional neural network. For the initial time step, the current segmentation output as of the time step may be a predetermined initial segmentation output. The input image may be a frame from a video and, for the initial time step, the current segmentation output as of the time step is a segmentation output generated for an earlier frame in the video. The total number of time steps in the one or more time steps may be smaller for the input image than for generating a final segmentation for the earlier frame. For each time step after the initial time step, the current segmentation output as of the time step may be the updated segmentation output from the preceding time step. Generating the network input from the features of the input image and the current segmentation output as of the time step may comprise concatenating the current segmentation output onto the features. The updated segmentation output for the time step may comprise, for each of the plurality of pixels, a respective score for each of the segmentation categories. Generating the final segmentation may comprise determining an assignment for each of the plurality of pixels from the scores for the segmentation categories for the pixel in the updated segmentation for the final time step. The updated segmentation output for the time step may comprise, for each of a plurality of pixels in a down-sampled version of the input image, a respective score for each of the segmentation categories. Generating the final segmentation may further comprise determining an assignment for each of the plurality of pixels in the down-sampled version from the scores for the segmentation categories for the pixel in the updated segmentation for the final time step and up-sampling the assignments to generate the final segmentation. Generating an updated segmentation output for the time step from the initial segmentation output for the time step and the current segmentation output as of the time step may comprise adding the updated segmentation output for the time step from the intermediate segmentation output for the time step and the current segmentation output as of the time step. The convolutional recurrent neural network may comprise a plurality of recurrent layers each having a plurality of convolutional gates. A convolution applied by at least one of the convolutional gates of at least one of the plurality of recurrent layers may be a 1×1 convolution. The method may further comprise determining a number of time steps to be included in the one or more time steps based on a number of time steps required to satisfy one or more criteria for generating the final segmentation of the input image. The one or more criteria may include one or more of: one or more criteria for the quality of the final segmentation, one or more criteria for a time required to generate the final segmentation, or one or more criteria for an amount of computational resources to be consumed by generating the final segmentation.

A further aspect of the present disclosure provides a system comprising one or more computers and one or more storage devices storing instructions that when executed by the one or more computers cause the one or more computers to perform any of the methods disclosed herein.

A further aspect of the present disclosure provides one or more computer storage media storing instructions that when executed by one or more computers cause the one or more computers to perform any of the methods disclosed herein.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes an image segmentation neural network system implemented as computer programs on one or more computers in one or more locations. The image segmentation neural network system is configured to receive an input image that includes multiple pixels and to process the input image using a recurrent neural network to generate a segmentation of the input image. The segmentation assigns each of the pixels to a respective segmentation category from a predetermined set of segmentation categories.

Generally, pixels that are assigned to the same segmentation category share some characteristics. That is, which pixel is assigned to which segmentation category depends on the characteristics of the image at the pixel. For example, the segmentation categories can be object categories, and the segmentation can classify each pixel into the object category to which an object that is depicted at the pixel belongs, i.e., as determined by the recurrent neural network. In other words, when the segmentation categories are object categories, the system attempts to classify each pixel in the portion of the image at which a given object is depicted into the object category to which the given object belongs. As another example, the segmentation categories can be components of the scene, e.g., background, foreground, and so on, and the segmentation can assign each pixel into the scene component into which the pixel belongs.

In an example implementation, the image can be an image taken by a camera of an autonomous vehicle and the segmentation can assign each pixel of the image to an object category from a plurality of object categories including pedestrians, cars, trucks, trees, traffic lights, traffic signs, and buildings.

In another example implementation, the image can be a picture of a human face and the segmentation can classify each pixel of the image into an object category from a plurality of object categories including eyes, eyebrows, nose, mouth, ears, hair, and skin.

In another example implementations, the image can be a satellite image and the segmentation can classify each pixel of the satellite image into a type of land cover, for example, areas of urban, suburban, agriculture, water, mountain, or forest.

Figure 1:
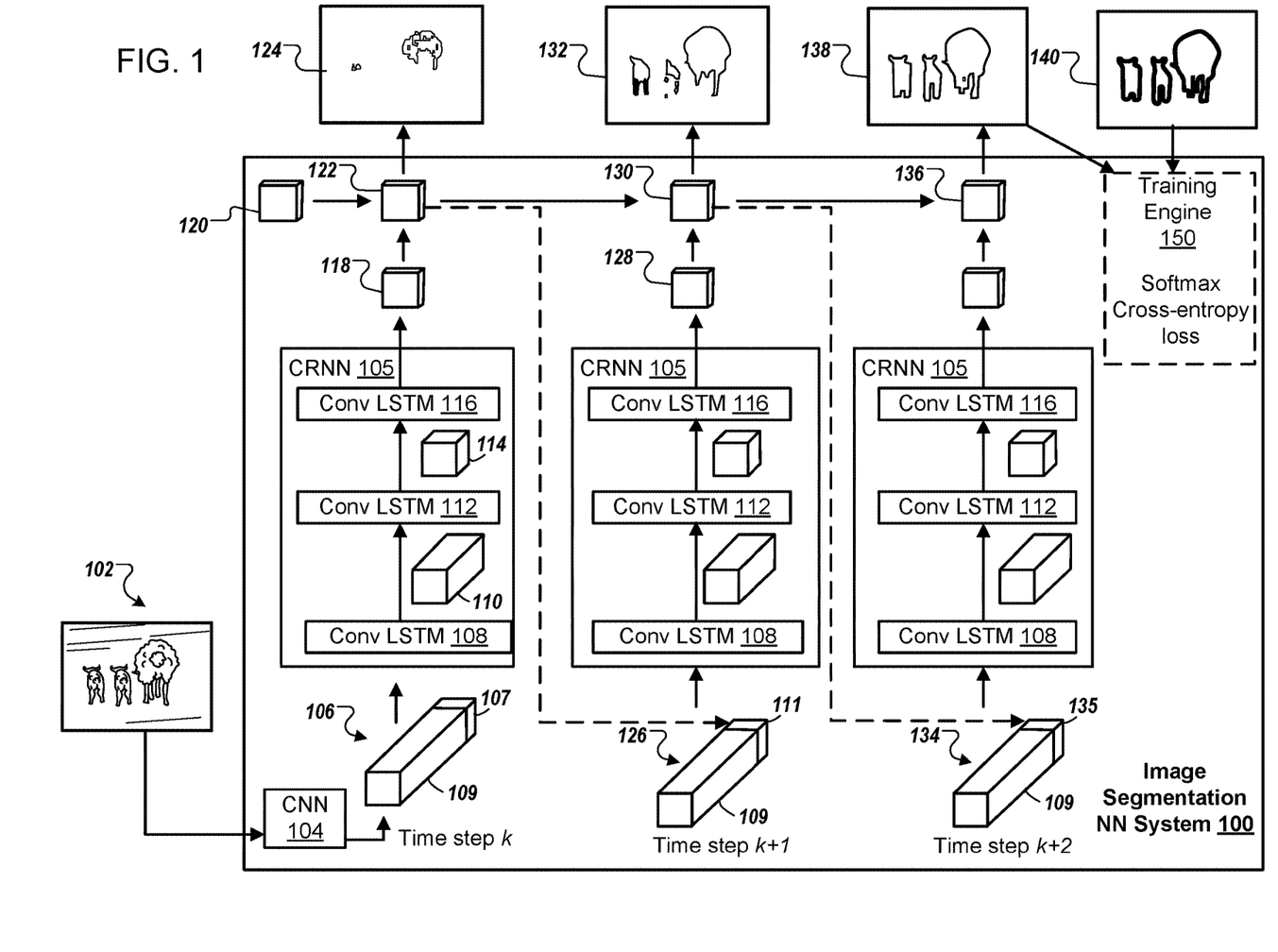
FIG. 1 shows an architecture of an example image segmentation neural network system.

FIG. 1 shows an example architecture of an image segmentation neural network system 100. The image segmentation neural network system 100 (also referred to as "the system 100" for simplicity) is an example of a system implemented as computer programs on one or more computers in one or more locations, in which the systems, components, and techniques described below can be implemented.

Generally, the system 100 is configured to receive an input image 102 that includes multiple pixels and to process the input image 102 to generate a final segmentation 138 of the input image. The final segmentation 138 assigns each of the pixels to a respective segmentation category from a predetermined set of segmentation categories.

To generate the final segmentation 138, the system 100 first obtains features of the input image 102. In some implementations, the system 100 obtains the features by processing the input image 102 using a convolutional neural network and using the output of one or more layers of the convolutional neural network as the features. For example, as shown in FIG. 1, the system 100 includes a convolutional neural network 104 that is configured to process the input image 102 to generate features 109 of the input image 102. The features of the input image 102 have a spatial resolution (that can be smaller than the original resolution of the input image 102) across a feature depth that includes many feature channels. For instance, given that the input image 102 has a spatial resolution of 513×513 pixels, the features 109 can have a spatial resolution of 65×65 pixels across 2048 feature channels.

The convolutional neural network 104 includes a plurality of neural network layers and has been pre-trained on an image classification task. The features of the input image 102 are generated from the outputs of one or more intermediate layers of the convolutional neural network 104. For instance, the convolutional neural network 104 can be a deep residual neural network, for example, a 101-layer ResNet neural network described in K. He, X. Zhang, S. Ren, and J. Sun, "Deep residual learning for image recognition," in IEEE Conference on Computer Vision and Pattern Recognition, 2016.

The system 100 then performs an iterative process in which, at each time step of N time steps (N≥1), the system 100 generates a network input for that time step and processes the network input using a convolutional recurrent neural network (convolutional RNN) 105 to generate an updated segmentation output for the time step. The updated segmentation output for the current time step is an improved version of the segmentation output generated at the preceding time step and is used as input to the next time step or is used to generate the final segmentation of the input image. The system 100 can adjust the number of time steps over which the image segmentation is generated to account for differing process constraints without needing to retrain the convolutional recurrent neural network 105 used to generate the final segmentation. The architecture of the convolutional recurrent neural network 105 allows the system to have a more fine-grained control over computational cost than existing systems (for example, systems that control computational cost by changing an output stride of a convolutional neural network) while still maintaining similar accuracy. In particular, by adjusting the number of time steps of the segmentation process, the system 100 can effectively modulate the amount of computational resources consumed by the segmentation process to satisfy constraints on available computational resources, time to generate the segmentation, or segmentation quality.

As shown in FIG. 1, for each of one or more time steps (for example, at time step k) starting from an initial time step and continuing until a final time step, the system 100 generates a network input 106 from (i) the features 109 of the input image 102 and (ii) a current segmentation output 107 as of the time step. The current segmentation output defines a current segmentation of the input image 102 that assigns each of the plurality of pixels to a respective segmentation category from a predetermined set of segmentation categories. For the initial time step, the current segmentation output as of the time step is a predetermined initial segmentation output. For each time step after the initial time step, the current segmentation output as of the time step is an updated segmentation output from the preceding time step. For example, at time step k, the current segmentation output 107 is an updated segmentation output 120 generated by time step k−1.

The system 100 generates the network input 106 by combining the features 109 and the current segmentation output 107. In some implementations, the current segmentation output 107 includes a respective score for each pixel in a down-sampled version of the input image 102, and the features 109 have a spatial resolution that is the same as the resolution of the down-sampled version of the input image 102. In these implementations, the system 100 can concatenates, e.g., along the depth dimension, the current segmentation output 107 with the features 109 of the input image 102 to generate the network input 106.

In some cases, the system 100 only performs the processing for one-time step (N=1), i.e., in these cases the initial time step and the final time step are the same time step and the processing only occurs for a single time step. In these cases, the current segmentation output for the single time step is a predetermined initial segmentation output.

After generating the network input 106, the system 100 processes the network input 106 using a convolutional recurrent neural network 105 (also referred to as the convolutional RNN 105) to generate an intermediate segmentation output 118 for the time step. The convolutional RNN includes one or more Long Short-term Memory (LSTM) neural network layers. For example, as shown in FIG. 1, the convolutional RNN 105 includes convolutional LSTM neural network layers 108, 112, and 116. Each convolutional LSTM has a plurality of convolutional gates. A convolution applied by at least one of the convolutional gates is a 1×1 convolution. Convolutional LSTM layers are described in more detail in S. Xingjian, Z. Chen, H. Wang, D.-Y. Yeung, W.-K. Wong, and W.-c. Woo, "*Convolutional lstm network: A machine learning approach for precipitation nowcasting,*" in Advances in neural information processing systems, pages 802-810, 2015.

The convolutional LSTM layers in the convolutional RNN 105 maintain the same spatial resolution of the features 109 while decreasing the depth of the features 109 from the number of image feature channels to the number of segmentation categories. In the example of FIG. 1, the convolutional RNN 105 collectively processes the network input 109 with features 109 having a depth of 2048 feature channels through convolutional LSTM 108, 112, and 116 to generate the intermediate segmentation output 118 having a depth of 21 segmentation categories including the background category.

After generating the intermediate segmentation output 118, the system 100 generates an updated segmentation output 122 for time step k from the current segmentation output 107 (which is the updated segmentation output 120 generated for time step k−1) and the intermediate segmentation output 118. The system 100 can generate the updated segmentation output 122, by combining, e.g., element-wise adding, the intermediate segmentation output 118 and the current segmentation output 107. The updated segmentation output 122 has the same depth as the intermediate segmentation output 118 (e.g., 21 segmentation categories) and is used as input at the next time step.

In some cases, the updated segmentation output 122 for the current time step k includes, for each of the pixels in the input image 102, a respective score for each of the segmentation categories. In these cases, the system 100 generates a temporary segmentation 124 for time step k by assigning each pixel to the category having the highest score among the scores for the pixel. As described below, the temporary segmentation is used to create a human-interpretable canvas that visually presents the segmentations of objects depicted in the input image.

In some other cases, the updated segmentation output 122 includes a respective score for each pixel in a down-sampled version of the input image 102 (e.g., the input image 102 has a size of 513×513 pixels and the down-sampled version has a size of 65×65 pixels). In these cases, the system 100 generates the temporary segmentation 124 by first determining a segmentation assignment for each pixel in the down-sampled version of the input image 102 using the updated segmentation output 122 to generate a segmentation of the down-sampled image. The system 100 then upsamples the segmentation of the down-sampled image, e.g., using a bilinear upsampling layer, to generate the temporary segmentation 124 of the input image. The temporary segmentation 124 can have the same size as the input image 102 (i.e., 513×513 pixels).

Based on the temporary segmentation 124, the system 100 can depict the pixels belonging to each segmentation category in a visually distinct manner from each other segmentation category to create a human-interpretable canvas that visually shows segmentations of objects depicted in the input image 102. The canvas is additively updated in the subsequent iterations. The segmentations in the canvas can be refined and errors of any segmentation can be corrected on subsequent iterations of the convolutional RNN 105.

The system 100 repeats the above process for the next time step k+1. In particular, the system 100 generates a network input 126 from (i) the original features 109 of the input image 102 and (ii) a current segmentation output 111 that is the updated segmentation output 122 of the previous time step k. The system 100 processes the network input 126 using the convolutional RNN 105 to generate an intermediate segmentation output 128 for the time step k+1. The system 100 then generates an updated segmentation output 130 for the time step k+1 from the current segmentation output 111 (which is the updated segmentation output 122 generated for time step k) and the intermediate segmentation output 128. Based on the updated segmentation output 130, the system 100 generates a temporary segmentation 132, which is used to additively update the human-interpretable canvas.

The system 100 repeats the above process for the subsequent time steps k+2, k+3, k+4 . . . until the final time step has been reached.

The temporary segmentation generated by the system 100 at the final time step is the final segmentation of the input image 102. In the example of FIG. 1, there are three time steps, thus the temporary segmentation 138 generated at time step k+2 is the final segmentation of the input image 102.

Once the system 100 has generated the final segmentation for the input image 102, the system 100 can then output the final segmentation. For example, the system 100 can output the final segmentation for presentation to a user, e.g., by depicting the pixels belonging to each segmentation category in a visually distinct manner from each other segmentation category. As another example, the system 100 can store data defining the final segmentation in association with the input image in one or more storage devices for later use. As yet another example, the system 100 can provide data specifying the segmentation as an input to another system that performs further processing based on the segmentation. Purely by way of example, such further processing may include controlling a device (such as a robot or autonomous vehicle) based on the segmentation.

While FIG. 1 illustrates three time steps, the system 100 can vary the number of time steps based on one or more criteria for the generation of the final segmentation.

For example, the criteria can specify a maximum amount of computational resources that can be used to generate the final segmentation, e.g., maximum number of processor cycles, disk reads, memory accesses, or other measure of computational resource use, and the system can perform only as many iterations as can be performed while using less than the maximum amount of computational resources.

As another example, the criteria can specify a maximum amount of time that can be taken to generate the final segmentation and the system can perform only as many iterations as can be performed in less than the maximum amount of time.

As another example, the criteria can specify a minimum quality for the final segmentation and the system can perform the minimum number of iterations that are necessary to generate a segmentation that would be expected to have at least the minimum quality.

In some cases, the system 100 can maintain data specifying how many computational resources or how much time the processing for one time step takes. The system then receives data specifying a maximum number of computational resources or a maximum amount of time allowed for generating a final segmentation for a given input image. Based on the maintained and received data, the system determines the maximum number of time steps that does not lead to an excess of resources or time over the specified maximum number of computational resources or the maximum amount of time, respectively.

To allow the convolutional RNN 105 to be used to efficiently generate a final segmentation for an input image, the image segmentation neural network system 100 includes a training engine 150, which is a software based system, subsystem, or process that is programmed to train the convolutional RNN 105 on training data using a supervised learning technique. Generally, the training engine 150 will be implemented as one or more software modules or components, installed on one or more computers in one or more locations. In some cases, one or more computers will be dedicated to a particular engine; in other cases, multiple engines can be installed and running on the same computer or computers.

In particular, during training, the training engine 150 obtains training data including an input image (e.g., input image 102) and a ground-truth segmentation of the input image (e.g., ground-truth segmentation 140). The training engine 150 then obtains features of the input image and iteratively processes the combination of the features and a current image segmentation output generated at the previous time step using the convolutional RNN 105 for N iterations (or N time steps with N≥1) in accordance with current values of parameters of the convolutional RNN 105 to generate a final segmentation for the input image (e.g., the final segmentation 138). Generally, increasing the number of iterations N improve the predictive accuracy of the convolutional RNN 105 (e.g., improving the accuracy of segmentation generated by the convolutional RNN). However, at a certain point (for example, when N=6), increasing the number of iterations only leads to minimal gains in the predictive accuracy of the convolutional RNN 105 and does not justify the added computational burden. Thus, N is selected based on a good balance between computational burden and predictive accuracy, i.e., N is chosen such that a high predictive accuracy is obtained at a low computational cost.

The training engine 150 computes a cross-entropy loss using the final segmentation 138 and the ground-truth segmentation 140 of the input image 102. The training engine 150 then adjusts the values of parameters of the convolutional RNN 105 to minimize the cross-entropy loss.

After training, the system 100 can use the trained convolutional RNN 105 to generate a final segmentation for a given input image in accordance with the trained values of parameters of the convolutional RNN 105.

In some cases, the image segmentation neural network system 100 can provide the trained convolutional RNN 105 or the trained values of the parameters of the convolutional RNN 105 to an external system. The external system can use the trained convolutional RNN 105 to generate a final segmentation for an input image in the manner described above.

As a particular example, after training, the system 100 or the external system can use the final segmentations to control a robot while the robot interacts with an environment. By having more accurate final segmentations available as input to a control policy or a planner for the robot, the robot can be more effectively controlled to complete specified tasks in the environment. For example, the robot can recognize one or more objects in the environment more accurately and can be controlled to take proper actions in response to the recognized objects, for example, changing a moving direction to avoid the objects. In similar way, the system 100 or the external system can use the final segmentations to control an autonomous vehicle, or to control any other device that interacts with real world objects.

The process for training the convolutional RNN 105 is described in detail below with reference to FIG. 3.

Figure 2:
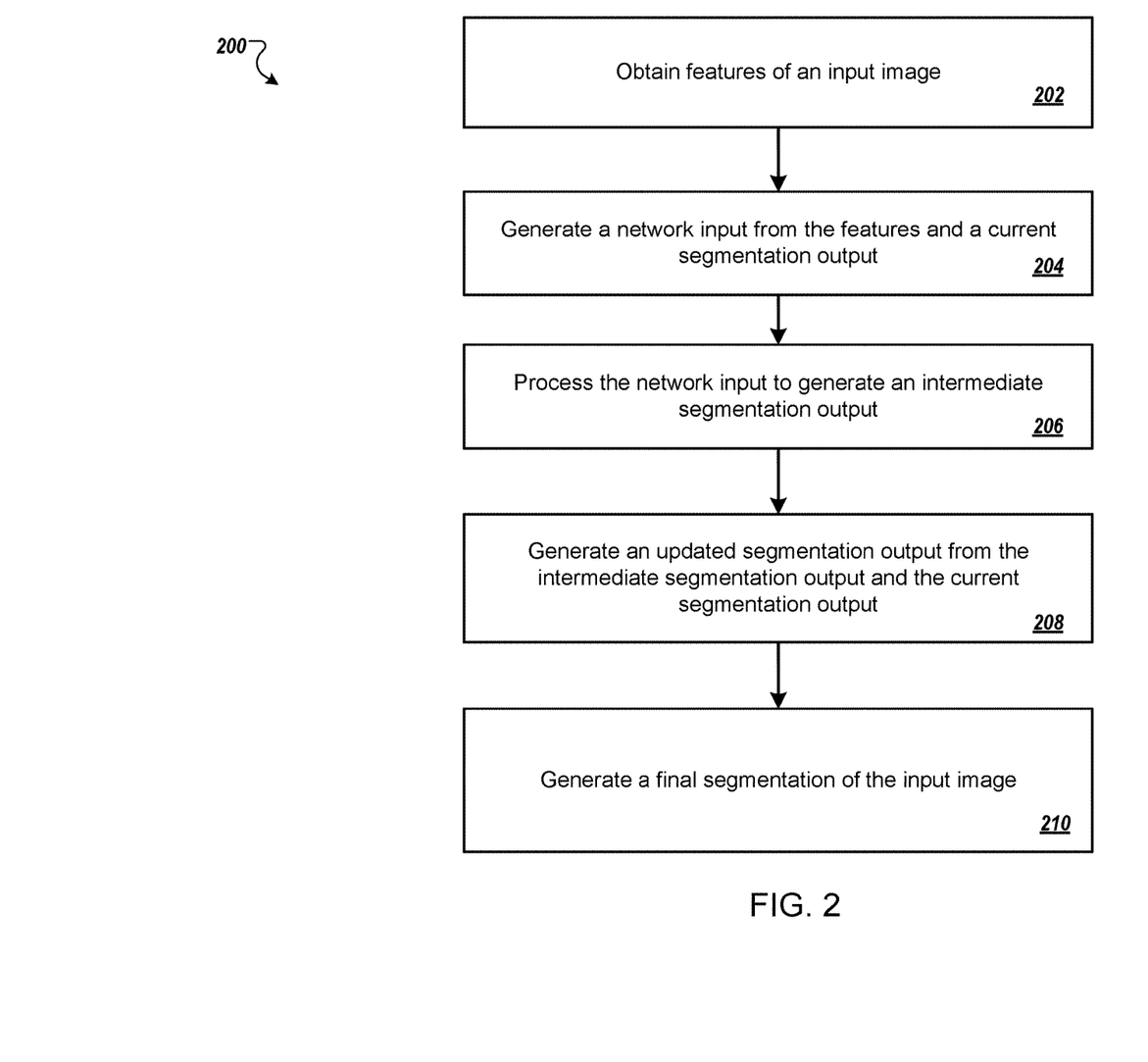
FIG. 2 is a flow diagram of an example process for segmenting an input image using an image segmentation neural network.

FIG. 2 is a flow diagram of an example process 200 for segmenting an input image using an image segmentation neural network. For convenience, the process 200 will be described as being performed by a system of one or more computers located in one or more locations. For example, a neural network system, e.g., the image segmentation neural network system 100 of FIG. 1, appropriately programmed, can perform the process 200.

The system obtains features of an input image (step 202). The input image includes a plurality of pixels. In some implementations, the system obtains the features by processing the input image using a convolutional neural network and using the output of one or more layers of the convolutional neural network as the features. The convolutional neural network includes a plurality of neural network layers and has been pre-trained on an image classification task. The features of the input image are generated from the outputs of one or more intermediate layers of the convolutional neural network.

For each of one or more time steps starting from an initial time step and continuing until a final time step, the system repeatedly performs the following operations (steps 204-208).

The system generates a network input from the features of the input image and a current segmentation output as of the time step (step 204). The current segmentation output defines a current segmentation of the input image that assigns each of the plurality of pixels to a respective segmentation category from a predetermined set of segmentation categories. For example, when the features of the input image include one or more feature maps, the system can concatenates, e.g., along the depth dimension, the current segmentation output with the features of the input image to generate the network input. For the initial time step, the current segmentation output as of the time step is a predetermined initial segmentation output. For each time step after the initial time step, the current segmentation output as of the time step is an updated segmentation output from the preceding time step.

In some cases, the system only performs the processing for one-time step, i.e., in these cases the initial time step and the final time step are the same time step and the processing only occurs for a single time step. In these cases, the current segmentation output for the single time step is a predetermined initial segmentation output.

The system processes the network input using a convolutional recurrent neural network in accordance with the current values of parameters of the convolutional recurrent neural network to generate an intermediate segmentation output for the time step (step 206).

The system generates an updated segmentation output for the time step from the initial segmentation output for the time step and the current segmentation output as of the time step (step 208). The system can generate the updated segmentation output, by combining, e.g., element-wise adding, the intermediate segmentation output and the current segmentation output.

The system repeatedly performs steps 202-208 until the final time step has been reached. At the final step, the system obtains an updated segmentation output for the final time step.

The system generates a final segmentation of the input image from the updated segmentation output for the final time step (step 210).

In some cases, the updated segmentation output for the final time step includes, for each of the pixels in the image, a respective score for each of the segmentation categories. In these cases, the system generates the final segmentation by assigning each pixel to the category having the highest score among the scores for the pixel.

In some other cases, the updated segmentation output for the final time step includes a respective score for each pixel in a down-sampled version of the input image. In these cases, the system generates the final segmentation by first determining a segmentation assignment for each pixel in the down-sampled version of the input image using the updated segmentation output to generate a final segmentation of the down-sampled image. The system then upsamples the final segmentation, e.g., using a bilinear upsampling layer, to generate the final segmentation of the input image.

Once the system has generated the final segmentation for the input image, the system can then output the final segmentation. For example, the system can output the final segmentation for presentation to a user, e.g., by depicting the pixels belonging to each segmentation category in a visually distinct manner from each other segmentation category. As another example, the system can store data defining the final segmentation in association with the input image in one or more storage devices for later use. As yet another example, the system can provide data specifying the segmentation as an input to another system that performs further processing based on the segmentation.

In some implementations, the system determines how many time steps to perform the processing for based on one or more criteria for the generation of the final segmentation, as described above with reference to FIG. 1.

Figure 3:
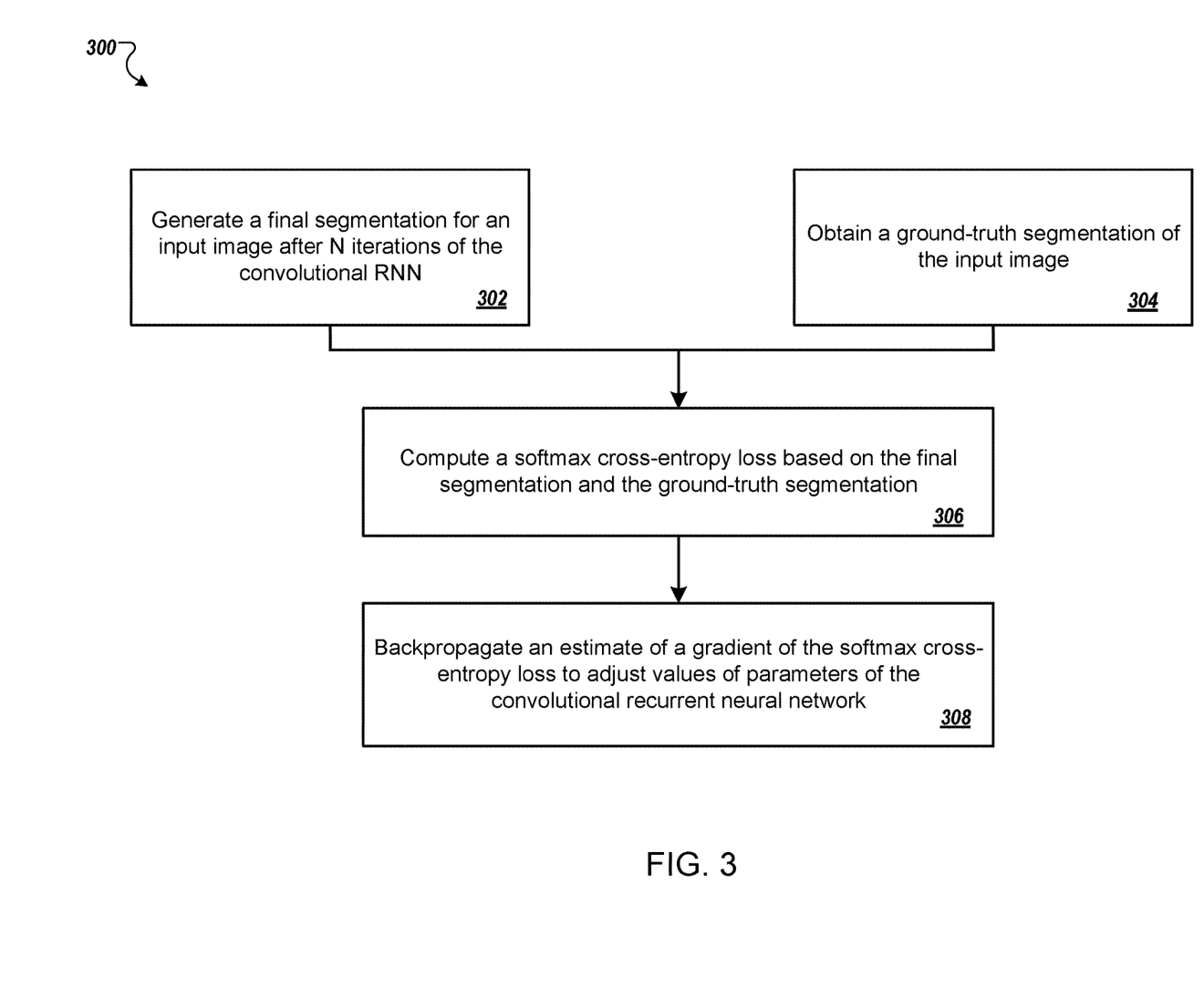
FIG. 3 is a flow diagram of an example process for training a convolutional recurrent neural network to perform an image segmentation task.

FIG. 3 is a flow diagram of an example process 300 for training a convolutional recurrent neural network to perform an image segmentation task. For convenience, the process 300 will be described as being performed by a system of one or more computers located in one or more locations. For example, a neural network system, e.g., the image segmentation neural network system 100 of FIG. 1, appropriately programmed, can perform the process 300.

The system obtains training data that includes one or more training input images and a ground-truth segmentation for each of the training input images (step 302). A training input image includes a plurality of pixels. A ground-truth segmentation for a training input image accurately assigns each of the plurality of pixels of the training input image into a respective segmentation category of a plurality of segmentation categories.

For a given training input image, the system generates a final segmentation for the training input image (step 304). In particular, the system first obtains features of the training input image, for example, by processing the training input image using a convolutional neural network that is trained for an image classification task.

The system repeatedly processes the combination of the features and a current image segmentation output generated at the previous time step using the convolutional RNN in accordance with current values of parameters of the convolutional RNN in order to generate a final segmentation for the input image. The system can repeat the process for N iterations (or N time steps) with $N \geq 1$. Generally, increasing the number of iterations improve the predictive accuracy of the convolutional RNN (e.g., improving the accuracy of segmentation generated by the convolutional RNN). However, at a certain point (for example, when N=6), increasing the number of iterations only leads to minimal gains in the predictive accuracy of the convolutional RNN and does not justify the added computational burden. Thus, N is selected based on a good balance between computational burden and predictive accuracy, i.e., N is chosen such that a high predictive accuracy is obtained at a low computational cost.

The process for generating a final segmentation for an input image after N iterations is described in detail above with reference to FIG. 1.

The system computes a cross-entropy loss based on the final segmentation and the ground-truth segmentation of the training input image (step 306).

The system backpropagates the gradient of the cross-entropy loss to adjust values of parameters of the convolutional recurrent neural network (step 308).

The system can adjust the current values of the parameters of the convolutional recurrent neural network by using mini-batch stochastic optimization or stochastic gradient optimization method in order to minimize the cross-entropy loss.

The system can repeatedly perform the process 300 on different training input images included in the training data in order to repeatedly update the parameter values of convolutional RNN.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A method performed by one or more computers, the method comprising:
   obtaining features of an input image, the input image comprising a plurality of pixels;
   for each of one or more time steps starting from an initial time step and continuing until a final time step:
      generating a network input by combining the features of the input image and a current segmentation output as of the time step, wherein the current segmentation output defines a current segmentation of the input image that assigns each of the plurality of pixels to a respective segmentation category from a predetermined set of segmentation categories,
      processing the network input that is generated by combining the features of the input image and the current segmentation output as of the time step using a convolutional recurrent neural network to generate an intermediate segmentation output for the time step, and
      generating an updated segmentation output for the time step from the intermediate segmentation output for the time step and the current segmentation output as of the time step,
   wherein for each time step after the initial time step, the current segmentation output as of the time step is the updated segmentation output from the preceding time step; and
   generating a final segmentation of the input image from the updated segmentation output for the final time step.

2. The method of claim 1, further comprising:
   outputting the final segmentation of the input image.

3. The method of claim 1, wherein obtaining the features of the input image comprises:
   receiving the input image; and
   processing the input image using a convolutional neural network to generate the features of the input image.

4. The method of claim 3, wherein the convolutional neural network comprises a plurality of layers and has been pre-trained on an image classification task, and wherein the features of the input image are generated from the outputs of one or more intermediate layers of the convolutional neural network.

5. The method of claim 1, wherein for the initial time step the current segmentation output as of the time step is a predetermined initial segmentation output.

6. The method of claim 1, wherein the input image is a frame from a video, and wherein for the initial time step the current segmentation output as of the time step is a segmentation output generated for an earlier frame in the video.

7. The method of claim 6, wherein the total number of time steps in the one or more time steps is smaller for the input image than for generating a final segmentation for the earlier frame.

8. The method of claim 1, wherein generating the network input from the features of the input image and the current segmentation output as of the time step comprises:
   concatenating the current segmentation output onto the features.

9. The method of claim 1, wherein the updated segmentation output for the time step comprises, for each of the plurality of pixels, a respective score for each of the segmentation categories.

10. The method of claim 9, wherein generating the final segmentation comprises determining an assignment for each of the plurality of pixels from the scores for the segmentation categories for the pixel in the updated segmentation for the final time step.

11. The method of claim 1, wherein the updated segmentation output for the time step comprises, for each of a plurality of pixels in a down-sampled version of the input image, a respective score for each of the segmentation categories.

12. The method of claim 11, wherein generating the final segmentation comprises determining an assignment for each of the plurality of pixels in the down-sampled version from the scores for the segmentation categories for the pixel in the updated segmentation for the final time step and up-sampling the assignments to generate the final segmentation.

13. The method of claim 1, wherein generating an updated segmentation output for the time step from the intermediate segmentation output for the time step and the current segmentation output as of the time step comprises adding the updated segmentation output for the time step from the intermediate segmentation output for the time step and the current segmentation output as of the time step.

14. The method of claim 1, wherein the convolutional recurrent neural network comprises a plurality of recurrent layers each having a plurality of convolutional gates.

15. The method of claim 14, wherein a convolution applied by at least one of the convolutional gates of at least one of the plurality of recurrent layers is a 1×1 convolution.

16. The method of claim 1, further comprising:
   determining a number of time steps to be included in the one or more time steps based on a number of time steps required to satisfy one or more criteria for generating the final segmentation of the input image.

17. The method of claim 16, wherein the one or more criteria include one or more of: one or more criteria for the quality of the final segmentation, one or more criteria for a time required to generate the final segmentation, or one or more criteria for an amount of computational resources to be consumed by generating the final segmentation.

18. A system comprising one or more computers and one or more storage devices storing instructions that when executed by the one or more computers cause the one or more computers to perform operations comprising:
   obtaining features of an input image, the input image comprising a plurality of pixels;
   for each of one or more time steps starting from an initial time step and continuing until a final time step:
      generating a network input by combining the features of the input image and a current segmentation output as of the time step, wherein the current segmentation output defines a current segmentation of the input image that assigns each of the plurality of pixels to a respective segmentation category from a predetermined set of segmentation categories,
      processing the network input that is generated by combing the features of the input image and the current segmentation output as of the time step using a convolutional recurrent neural network to generate an intermediate segmentation output for the time step, and
      generating an updated segmentation output for the time step from the intermediate segmentation output for the time step and the current segmentation output as of the time step,
   wherein for each time step after the initial time step, the current segmentation output as of the time step is the updated segmentation output from the preceding time step; and
   generating a final segmentation of the input image from the updated segmentation output for the final time step.

19. One or more non-transitory computer storage media storing instructions that when executed by one or more computers cause the one or more computers to perform operations comprising:
   obtaining features of an input image, the input image comprising a plurality of pixels;
   for each of one or more time steps starting from an initial time step and continuing until a final time step:
      generating a network input by combining the features of the input image and a current segmentation output as of the time step, wherein the current segmentation output defines a current segmentation of the input image that assigns each of the plurality of pixels to a respective segmentation category from a predetermined set of segmentation categories,
      processing the network input that is generated by combining the features of the input image and the current segmentation output as of the time step using a convolutional recurrent neural network to generate an intermediate segmentation output for the time step, and
      generating an updated segmentation output for the time step from the intermediate segmentation output for the time step and the current segmentation output as of the time step,
   wherein for each time step after the initial time step, the current segmentation output as of the time step is the updated segmentation output from the preceding time step; and generating a final segmentation of the input image from the updated segmentation output for the final time step.

\* \* \* \* \*